United States Patent
Robertson et al.

(10) Patent No.: US 6,183,213 B1
(45) Date of Patent: Feb. 6, 2001

(54) HYDRAULIC GEAR PUMP POWER PACK FOR A POWER STEERING SYSTEM WITH SEPARATE FLOW PATHS FOR FLUID NOISE REDUCTION

(75) Inventors: James Richard Robertson, Walled Lake; Sunil Palakodati, Westland, both of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/271,479

(22) Filed: Mar. 17, 1999

(51) Int. Cl.[7] .................................................. F04B 39/00
(52) U.S. Cl. ........................................... 417/312; 417/540
(58) Field of Search .................................... 417/312, 310, 417/410.4, 540; 181/403

(56) References Cited

U.S. PATENT DOCUMENTS

| | | |
|---|---|---|
| 2,732,802 | 1/1956 | Eames, Jr. . |
| 2,762,311 | 9/1956 | Litzenberg . |
| 2,928,961 | 3/1960 | Morrill . |
| 3,137,234 | 6/1964 | Mosbacher . |
| 3,434,282 * | 3/1969 | Shelhart ............................. 417/312 |
| 3,790,309 | 2/1974 | Volz . |
| 4,207,033 * | 6/1980 | Drutchas et al. .................... 417/540 |
| 4,540,354 | 9/1985 | Tuckey . |
| 4,642,035 * | 2/1987 | Nyquist ............................... 417/312 |
| 5,173,034 * | 12/1992 | Riffe .................................... 417/312 |
| 5,785,013 | 7/1998 | Sinn . |

FOREIGN PATENT DOCUMENTS

| | | |
|---|---|---|
| 4303328 | 8/1994 | (DE) . |
| 1539393 | 1/1990 | (SU) . |

OTHER PUBLICATIONS

Machine Design Magazine—"New Technique Muffle Hydraulic Noise" by Stanley J. Skaistis, vol. 51, No. 7, Mar. 22, 1979, pp. 120–126.

* cited by examiner

Primary Examiner—Charles G. Freay

(57) ABSTRACT

A hydraulic pump [10] for use in a power steering system includes a power steering fluid chamber [26] for receiving power steering fluid from a fluid source. The power steering fluid chamber [26] is in fluid communication with a first fluid conduit [40] and a second fluid conduit [46] each of which has different lengths. A pressure valve attenuator [52] has two ports, one in communication with the first fluid conduit [40] and one in communication with the second fluid conduit [46] for receiving power steering fluid from the power steering fluid chamber [28] such that fluid borne noise in the power steering system is minimized.

20 Claims, 1 Drawing Sheet

HYDRAULIC GEAR PUMP POWER PACK FOR A POWER STEERING SYSTEM WITH SEPARATE FLOW PATHS FOR FLUID NOISE REDUCTION

TECHNICAL FIELD

The present invention relates generally to hydraulic pumps. More particularly, the present invention relates to an apparatus for reducing fluid borne noise in a hydraulic pump.

BACKGROUND ART

The use of hydraulic pumps, such as power steering pumps, is well known in the automotive industry. Conventional hydraulic pumps, such as those used in power steering systems, are positive displacement pumps. Positive displacement pumps, such as gear pumps, have a pumping action that creates a pressure fluctuation in the pump discharge flow. Any variations in this pump discharge flow are converted to pressure pulsations when they encounter circuit resistance. This conversion is referred to in the art as pressure ripple.

The pressure pulsations transmitted through the fluid can cause resonating of the system components downstream of the pump, which is known in the art as fluid borne noise. This pressure fluctuation can also excite structure in the pumping circuit causing them to vibrate and generate additional objectionable noise.

Typical pumps generate the majority of their noise energy at the fundamental or pumping frequency (shaft speed x the number of pumping chambers). Typical pumps also can generate appreciable noise energy in multiples of harmonics of the fundamental frequency. The sound level of the noise energy generated by typical pumps generally decreases at higher frequencies, but even fourth and fifth harmonics can have enough energy to cause noise.

Additionally, the configuration of these prior pumps is such that they require the use of hoses for fluid transfer. The hoses are typically located between the outlet of the pump and the steering gear. By adding a pressure pulse attenuator as a separate part downstream of the pump, the size of the power steering gear pack and the cost of the power steering system are increased.

It would therefore be desirable to provide a pump for use in a power steering system that is able to reduce the amount of fluid borne noise and is also compact.

SUMMARY OF THE INVENTION

It is therefore an object of the present invention to provide an apparatus for reducing the fluid borne noise in a power steering system.

It is a further object of the present invention to provide a pressure pulse attenuator that is integral with the pump housing.

In accordance with one aspect of the invention, an apparatus for reducing the fluid borne noise in a power steering system is provided. The apparatus includes a hydraulic pump for use in a power steering system. The hydraulic pump has a pump housing with a power steering fluid inlet port formed in the pump housing. The inlet port is in fluid communication with a power steering fluid reservoir to transfer power steering fluid to a power steering fluid chamber formed in the pump housing. A first fluid conduit and a second fluid conduit are formed in the pump housing. The first fluid conduit has an inlet opening and an exit opening and the second fluid conduit has a separate inlet opening and exit opening. The first fluid conduit inlet opening is in fluid communication with the power steering fluid chamber to receive power steering fluid therethrough and the second fluid conduit inlet opening is also in fluid communication with the power steering fluid chamber to receive power steering fluid therethrough. The first fluid conduit exit opening and the second fluid conduit exit opening are in fluid communication with a pressure wave attenuator to transfer power steering fluid thereto. The second fluid conduit has a distance between the inlet opening and the exit opening that is longer than a distance of the first fluid conduit between the inlet opening and the exit opening. The pressure wave attenuator is in fluid communication with an outlet port to convey the power steering fluid to a steering gear.

Other objects and features of the present invention will become apparent when viewed in light of the detailed description of the preferred embodiment when taken in conjunction with the attached drawings and appended claims.

DESCRIPTION OF THE PREFERRED EMBODIMENTS

Figure 1:
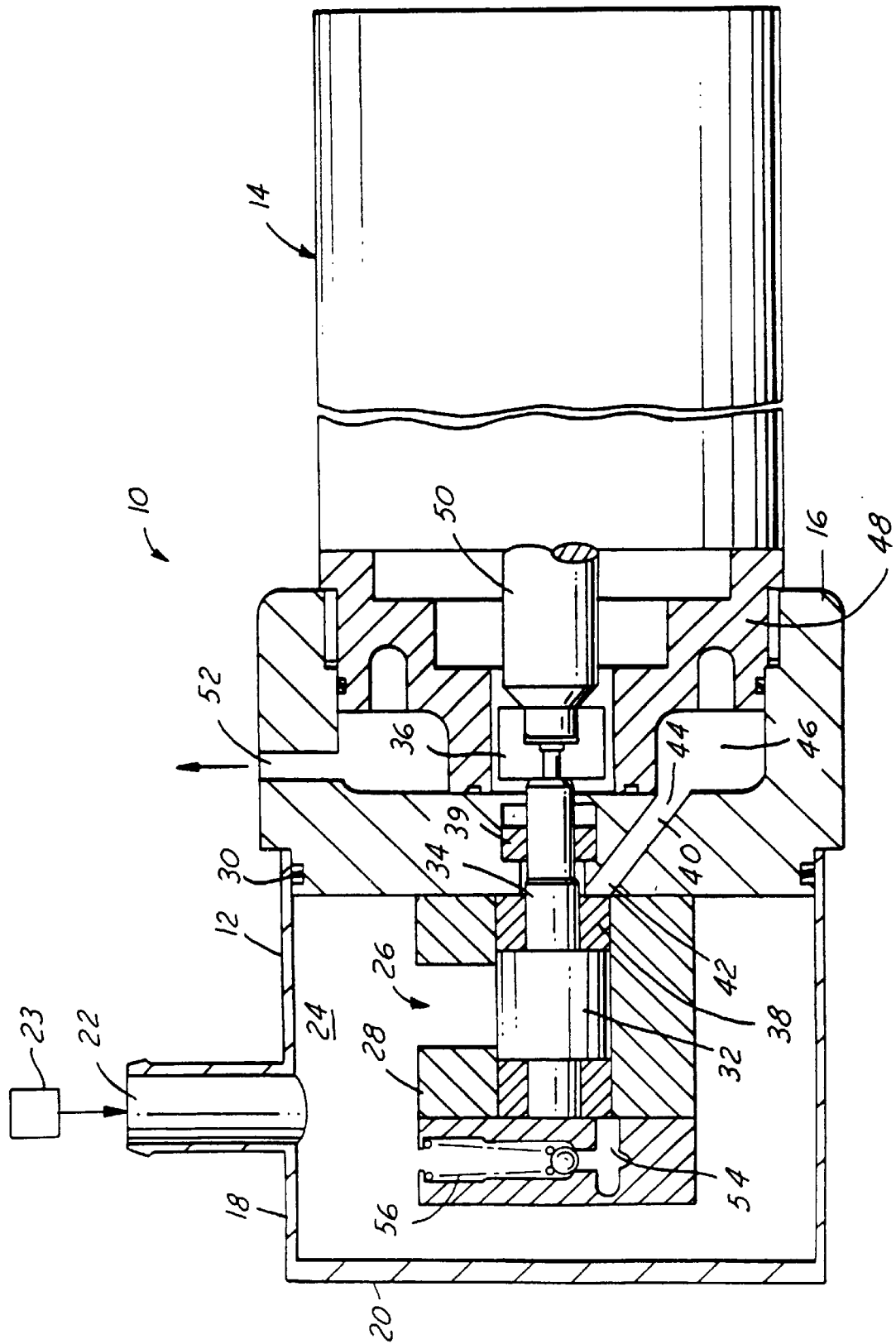
FIG. 1 is a cross-sectional view of a gear pump and associated motor housing in accordance with a preferred embodiment of the present invention.

Referring now to FIG. 1, which is a cross-sectional illustration of a preferred hydraulic pump 10 in accordance with the present invention. The pump 10 has a pump housing 12 which is mounted to a motor 14 by a mounting apparatus 16, such as a bracket or the like. The hydraulic pump 10 is preferably a positive displacement pump, such as a gear pump, however any other positive displacement pump may be utilized. The disclosed hydraulic pump 10 is preferably for use in a vehicle power steering system, but may be utilized in a variety of other systems, including non-automotive applications.

The pump housing 12 has an outer wall portion 18 and an end cap 20. The outer wall portion 18 preferably has an inlet port 22 formed therein to allow the transfer of fluid from a fluid reservoir 23 into the pump housing 12. The preferred fluid is a power steering fluid, however, other fluids may be utilized depending upon the application for the pump 10. The inlet port 22 may obviously be formed through other portions of the pump housing 12, including the end cap 20.

A power steering fluid chamber 24 is formed within the pump housing 12 to receive the power steering fluid transferred thereto by the inlet port 22. The power steering fluid chamber 24 is in fluid communication with a fluid passageway 26 formed in a gear housing 28 disposed within the pump housing 12. The power steering fluid chamber 24 is defined by the outer wall portion 18, the end cap 20, and the mounting apparatus 16. A seal 30 is preferably disposed at the junction between the mounting apparatus 16 and the outer wall portion 18 of the pump housing 12 in order to prevent any leakage of power steering fluid from the power steering fluid chamber 24 to the motor 14.

As shown in FIG. 1, a drive gear 32 is housed within the gear housing 28 and is in rotational communication with a drive shaft 34 to operate the hydraulic pump 10. The drive shaft 34 is coupled to the motor 14 by a drive coupling 36 to drive the shaft 34. The motor 14 is preferably an electric motor, however, a variety of other motors may be utilized.

The drive shaft 34 is also in rotational communication with a bearing plate 38, which is disposed in the gear housing 28. A seal 39 is preferably disposed around the drive shaft 34 to prevent the fluid leakage from the fluid chamber 24 to the motor 14.

The fluid passageway 26 has two fluid conduits that receive power steering fluid therefrom. The first fluid conduit 40 has a fluid inlet opening 42 in communication with the fluid passageway 26 and a fluid outlet opening 44. The second fluid conduit 46 has a fluid inlet opening 48 and a fluid outlet opening 50. The first fluid outlet 44 and the second fluid outlet 50 both open into a pressure wave attenuator 52. The pressure wave attenuator 52 is preferably formed between the mounting apparatus 16 and a motor end plate 54 which is secured to the motor 14 around the motor output 56. It should be understood that the location of the pressure wave attenuator 52 may be changed. However, in accordance with the present invention, it is preferred that the pressure wave attenuator 52 is formed integral with the pump housing. The pressure wave attenuator 52 is in fluid communication with output passage 58 to convey the power steering fluid to a steering gear.

In the preferred embodiment, the first fluid conduit 40 and the second fluid conduit 46 have different lengths. As shown in the drawing, the first fluid conduit 40 is longer than the second fluid conduit 46. However, it should be understood that the configuration of the lengths may be reversed. While the first and second fluid conduits 40, 46 have different lengths, they are preferably formed of the same diameter. By splitting the flow of fluid, from the fluid passageway 26, equally between the first and second fluid conduits 40, 46, which are of different lengths, and then recombining the flows of fluid at the pressure wave attenuator 52, the level of fluid borne noise can be significantly reduced.

Because the fluid flows in the first fluid conduit 40 and the second fluid conduit 46 travel different distances, they are out of phase when they are recombined. This configuration helps to cancel the fundamental frequency and its harmonics, thus reducing the amount of fluid borne noise. Further, it is also preferred that the second fluid conduit 46 be configured such that it is 180 degrees out of phase with the first fluid conduit 40 to further assist in the cancellation of the fundamental frequency as well as the amount of fluid borne noise.

The first fluid conduit 40 is also preferably in communication with a pressure relief valve 60 to allow excess pressure in the pump 10 to be relieved by allowing fluid to exit the first fluid conduit 40 through the valve and reenter the power steering fluid chamber 24.

By positioning the pressure wave attenuator 52 in the mount 16 between the pump 10 and the motor 14, the amount of fluid borne noise can be reduced due to phase tuning. Further, the mounting apparatus 16 and the motor end cover 54 serve as expansion chamber walls, which decrease the cost and size of the pump by eliminating the requirement for a separate part. This configuration also eliminates the requirement for hose tuning which results in substantial cost savings.

While particular embodiments of the invention have been shown and described, numerous variations and alternate embodiments will occur to those skilled in the art. Accordingly, it is intended that the invention be limited only in terms of the appended claims.

What is claimed is:

1. A hydraulic pump for use in a power steering system, comprising:

a pump housing;

a power steering fluid inlet port formed in said pump housing and in communication with a power steering fluid reservoir;

a power steering fluid chamber formed in said pump housing and in communication with said power steering fluid reservoir to receive said power steering fluid from said fluid inlet port;

a first fluid conduit having a first fluid conduit inlet opening and a first fluid conduit exit opening, said first fluid conduit inlet opening being in fluid communication with said power steering fluid chamber to receive said power steering fluid therethrough;

a second fluid conduit having a second fluid conduit opening inlet and a second fluid conduit exit opening said second fluid conduit inlet opening being in fluid communication with said power steering fluid chamber to receive power steering fluid therethrough;

an integral pressure wave attenuator in communication with both said first fluid conduit exit opening and second fluid conduit exit opening to receive said power steering fluid therefrom;

said second fluid conduit have a distance between said second fluid conduit inlet opening and said second fluid conduit exit opening that is longer than a distance of said first fluid conduit between said first fluid conduit inlet opening and said second fluid conduit exit opening in order to reduce the amount of fluid borne noise generated by pumping of the fluid; and a pump outlet in communication with said integral pressure wave attentuator to convey said power steering fluid from said pressure wave attenuator to a steering gear.

2. A hydraulic pump as recited in claim 1, wherein said first fluid conduit exit opening is configured to enter said pressure wave attenuator 180 degrees out of phase from said second fluid conduit exit opening.

3. A hydraulic pump as recited in claim 1, wherein said pressure wave attenuator is formed integrally in said pump housing.

4. A hydraulic pump as recited in claim 1, wherein a motor is attached to said pump by a mounting apparatus.

5. A hydraulic pump as recited in claim 4, wherein said pressure wave attenuator is formed between said motor and said pump housing.

6. A hydraulic pump as recited in claim 1, wherein a pressure relief valve is in communication with one of said first or second fluid conduits.

7. A hydraulic pump as recited in claim 1, wherein said power steering fluid chamber is disposed around a drive gear.

8. A power steering system for an vehicle, comprising:

a fluid reservoir containing a supply of power steering fluid;

a hydraulic pump, having a pump housing in communication with said fluid reservoir;

an electric motor attached to said hydraulic pump;

a fluid chamber formed in said hydraulic pump for receiving and housing said power steering fluid from said fluid reservoir;

a first fluid conduit being in fluid communication with said fluid chamber, said first fluid conduit having an inlet opening, an exit opening and a predetermined length between said inlet opening and said exit opening;

a second fluid conduit being in fluid communication with said fluid chamber, said second fluid conduit having an inlet opening, an exit opening, and a predetermined length between said inlet opening and said exit opening; and a pressure wave attenuator in communication with both said first fluid conduit and said second fluid conduit for receiving said power steering fluid from said fluid chamber to minimize any fluid borne noise is said system, said pressure wave attenuator being in communication with a steering gear for delivering said power steering fluid thereto.

9. A power steering system as recited in claim 8, wherein said first fluid conduit predetermined length is different than said second fluid conduit predetermined length in order to help reduced said fluid borne noise.

10. A power steering system as recited in claim 8, wherein said fluid from said first fluid conduit enters said pressure wave attenuator approximately 180 degrees out of phase from said fluid from said second fluid conduit which enters said pressure wave attenuator.

11. A power steering system as recited in claim 9, wherein said pump is attached to said motor by a mounting apparatus.

12. A power steering system as recited in claim 11, wherein said mounting apparatus is a bracket.

13. A power steering system as recited in claim 11, wherein said motor has an end plate formed thereon, and wherein said pressure wave attenuator is formed between said mounting apparatus and said end plate.

14. A power steering system as recited in claim 9, further comprising a pressure relief valve in communication with one of said first or second fluid conduits for relieving fluid pressure in said pump by allowing fluid to exit said first or second fluid conduit and reenter said fluid chamber.

15. A method for reducing the level of fluid borne noise in a hydraulic pump comprising:

providing a source of hydraulic fluid;

delivering a supply of hydraulic fluid to said pump;

providing a pressure wave attenuator in communication with said pump;

providing a first fluid conduit with a predetermined length that is in communication at an inlet with said supply of hydraulic fluid and at an outlet with said pressure wave attenuator;

providing a second fluid conduit with a predetermined length that is in communication at an inlet with said supply of hydraulic fluid and at an outlet with said pressure wave attenuator, said predetermined length of said second fluid conduit being different than said predetermined length of said first fluid conduit; and equally transferring said supply of hydraulic fluid in said pump through said first fluid conduit and said second conduit and into said pressure wave attentuator such that fluid borne noise in said pump is reduced.

16. A method as recited in claim 15, wherein said hydraulic pump in incorporated into a power steering system of a vehicle.

17. A method as recited in claim 16, wherein said hydraulic pump is operated by a motor mounted thereto by a mounting bracket.

18. A method as recited in claim 17, wherein said pressure wave attenuator is formed between said motor and said mounting bracket.

19. A method as recited in claim 18, wherein said pressure wave attenuator further comprises an outlet for conveying said power steering fluid to a steering gear.

20. A method as recited in claim 15, wherein said step of equally transferring further comprises delivering said power steering fluid from said first fluid conduit to said pressure wave attenuator 180 degrees out of phase from said power steering fluid delivered to said pressure wave attenuator by said second fluid conduit.

* * * * *